Jan. 15, 1924.  
T. FULLBRIGHT  
1,481,055  
MEAT CUTTING IMPLEMENT OR TOOL  
Filed Sept. 27, 1922  
2 Sheets-Sheet 1
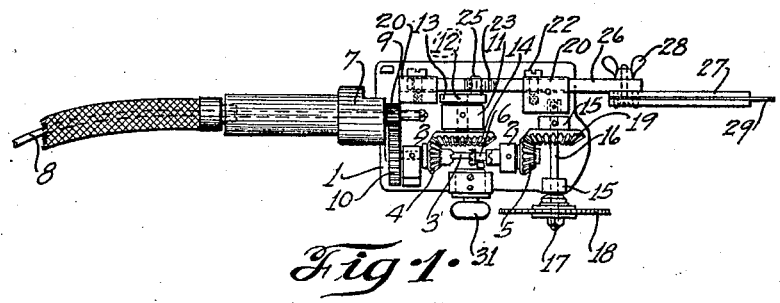
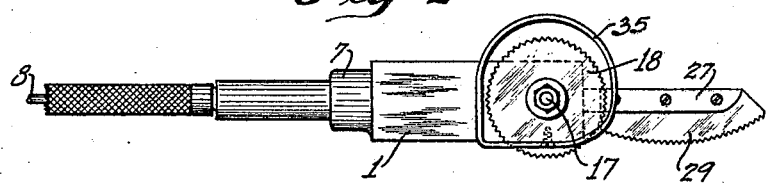
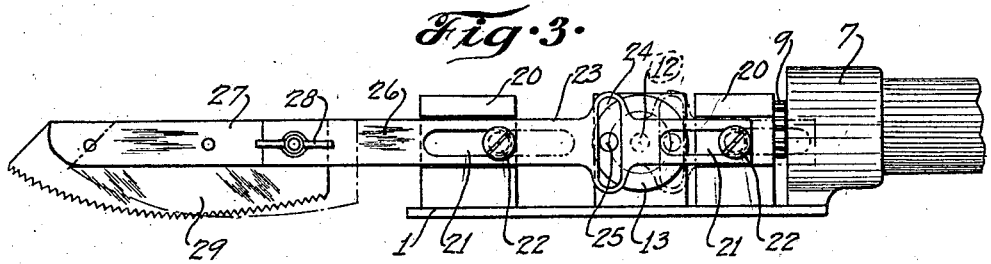
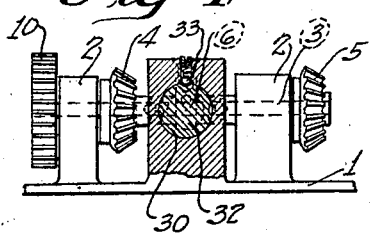
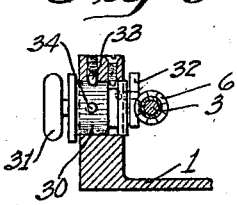
INVENTOR  
Thomas Fullbright.  
By Ralph Keenh  
ATTORNEY INVENTOR
Thomas Fullbright.
BY
ATTORNEY Patented Jan. 15, 1924.

1,481,055

UNITED STATES PATENT OFFICE.

THOMAS FULLBRIGHT, OF ST. LOUIS, MISSOURI, ASSIGNOR TO GEORGE SAMPT, OF ST. LOUIS, MISSOURI.

MEAT-CUTTING IMPLEMENT OR TOOL.

Application filed September 27, 1922. Serial No. 590,823.

*To all whom it may concern:*

Be it known that I, THOMAS FULLBRIGHT, a citizen of the United States, residing at the city of St. Louis, State of Missouri, have invented a certain new and useful Improvement in Meat-Cutting Implements or Tools; of which the following is a specification, reference being had to the accompanying drawings, forming a part thereof.

This invention relates generally to cutting implements or tools and, more particularly, to a certain new and useful improvement in tools especially adapted for the cutting and slicing of meat and other such work.

The chief objects of my present invention are to provide a tool or implement of the class mentioned which is simple in form and construction; which may be economically manufactured; which is readily portable and manipulated with safety and convenience, and which is rapid and efficient in operation.

With the above and other objects in view, my present invention resides in the novel features of form, construction, arrangement, and combination of parts hereinafter described and afterwards pointed out in the claims.

In the accompanying drawing,

Figure 1 is a plan view of a tool or implement embodying my invention, the upper or top portion of the casing being removed;

Figure 2 is a side elevational view of the tool or implement;

Figure 3 is an enlarged side elevational view of one of the cutting members of the tool and its actuating mechanism, the casing of the tool being omitted;

Figures 4 and 5 are enlarged detail views of the clutch-mechanism forming part of the tool.

Figure 6:
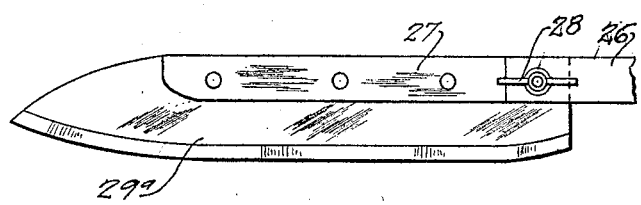
Figures 6, 7, and 8 are enlarged fragmental views of the tool equipped with modified forms of cutting-members.

Referring now in detail and by reference characters to the accompanying drawings, 1 indicates the main-portion or body of the tool, which is preferably in the form of a two-piece metallic casing or shell. Disposed within and upon the base of shell 1, as seen in Figures 1 and 4, are bearings 2—2, journaled for rotation upon which, within the shell 1, is a shaft 3. Loosely mounted on shaft 3, is a pair of miter-gears 4, 5, and feathered for slidable movement on shaft 3; intermediate the gears 4, 5, is a sleeve 6 adapted for clutching engagement with the gears 4, 5, for purposes shortly appearing.

Journaled for rotation in a bearing 7 on a wall of shell 1, is the inwardly projecting end of a preferably flexible power-shaft 8, driven from or by any suitable preferably electrical source of power; and fixed upon said shaft-end and within shell 1, is a gear 9 constantly in mesh with a gear 10 fixed on the shaft 3.

Journaled for rotation in a bearing 11 also located within and upon the base of shell 1, is a short shaft 12 disposed at right angles to shaft 3, fixed upon the opposite ends of which are a disk or crank 13 and a gear 14, the latter being constantly in mesh with gear 4.

Disposed in alignment in shell 1, as seen in Figure 1, are additional bearings 15—15, journaled for rotation upon which and also running at right angles to shaft 3, is a shaft 16, one end of which, as at 17, projects exteriorly of shell 1. Carried by and upon such projecting end 17 of shaft 16, is a circular saw or other suitable rotary cutting-member 18 preferably surrounded by a guard 35 and fixed upon shaft 16 within shell 1, is a gear 19 constantly in mesh with gear 5.

Figure 7:
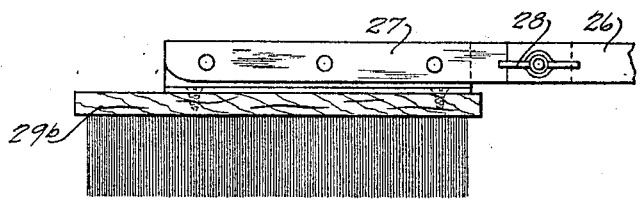
Figure 8:
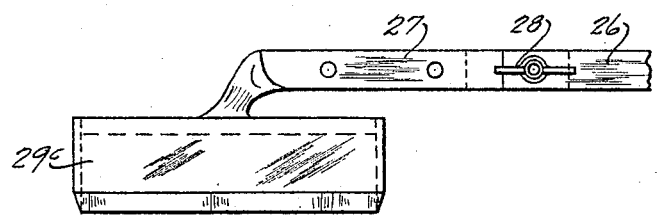

Disposed within and upon the base of shell 1, as also best seen in Figure 1, is an aligning pair of blocks 20—20, supported for lengthwise movement upon which, as by means of longitudinal slots 21—21 and pins 22—22, as seen in Figure 3, is a suitably elongated bar 23 formed or provided intermediate its longitudinal slots 21, with a transverse slot 24. Working in slot 24 is a stub-pin 25 projecting eccentrically from disk 13. The shaft 23 is disposed preferably at right angles to shaft 16 and one end 26 of which also projects exteriorly of the shell 1. Suitably attached, as by means of a holder, brace, or gripping-member 27 and a wing-nut or the like 28, for removal and replacement to the projecting end 26 of bar 23, is a second work-operating tool which may interchangeably vary in form and construction to perform the particular work and to meet the particular use to which the tool may be applied, such tool being, for instance, in the form of a saw 29, as in Figures 1, 2, and 3, or in the form of a sharp-edged blade or knife 29ª, as in Figure 6, or in the form of a wire or other suitable brush 29ᵇ, as in Figure 7, or in the form of a scraper 29ᶜ, as in Figure 8.

Journaled transversely in a wall of shell 1, as best seen in Figure 5, is a barrel 30 provided upon its outer face with an operating finger-grip or knob 31 and provided eccentrically upon its inner face with an inwardly projecting pin or bar 32 having operating engagement with clutch-sleeve 6, as best seen in Figure 1.

In use or operation, assuming power-shaft 8 to be rotating and it be desired to apply the rotary cutting tool 18 to the work, barrel 30 is suitably rotarily actuated by means of its grip 31 to throw the sleeve 6 into clutching-engagement with gear 5, whereupon rotary movement from shaft 3 will be imparted to gears 5 and 19 and consequently also to shaft 16 and its carried tool 18. Should it be desired, on the other hand, to apply the tool 29 to the work, the barrel 30 is correspondingly selectively actuated to throw the sleeve 6 into clutching engagement with the other or opposite gear 4, whereupon rotary-movement is imparted to gears 4 and 14 and to disk or crank 13, and shaft 23 and its carried tool 29, in turn, through the rotary movement of disk 13 and its pin 25 and the working engagement between pin 25 and bar 23 at its transverse slot 24, reciprocated for working operations. As best seen in Figures 4 and 5, shell 1 is provided with a spring-pressed pin 33 adapted to selectively seat in recesses 34 suitably spaced upon the periphery of barrel 30 to releasably lock the barrel 30 and consequently also the clutch-sleeve 6 either in neutral position or in engagement with one or the other of the gears 4, 5.

My new tool may be readily and inexpensively manufactured, may be easily repaired in any of its parts, is readily portable, may be manipulated with safety and convenience, its actuating parts being enclosed and guarded, effects a displacement of hand or manually actuated so-called cutting members with resulting economy in time and labor in the cutting of meat, bones, and other products and in other work-operations as herein mentioned, and is exceedingly rapid and efficient in the performance of its intended functions.

I am aware that changes in the form, construction, arrangement, and combination of the several parts of my new tool may be made and substituted for those herein shown and described without departing from the nature and principle of my invention.

Having thus described my invention, what I claim and desire to secure by Letters Patent is:

1. A tool of the class described including, in combination, a pair of cutting-members, and means comprising a pair of gears and a shiftable clutch-member adapted for driving engagement with one or the other of said gears for selectively rotarily actuating one of said members or reciprocatorily actuating the other of said members.

2. A tool of the class described comprising, in combination, a casing, a bar disposed for lengthwise movement in the casing, a shaft journaled for rotation in the casing, cutting-tools carried by both the bar and the shaft, and means comprising a pair of rotary gears and a shiftable clutch-member adapted for driving engagement with one or the other of the gears for selectively reciprocating the bar or rotating the shaft and their respective carried tools.

3. A tool of the class described comprising, in combination, a casing, a bar disposed for lengthwise movement in the casing, a shaft journaled for rotation in the casing, cutting-tools carried by both the bar and the shaft, means comprising a pair of rotary gears and a shiftable clutch-member adapted for driving engagement with one or the other of the gears for selectively reciprocating the bar or rotating the shaft and their respective carried tools, and means for releasably locking the clutch member in driving engagement with one or the other of the gears.

4. A tool of the class described comprising, in combination, a casing, a bar disposed for lengthwise movement in the casing, a shaft journaled for rotation in the casing, cutting-tools carried by both the bar and the shaft, means comprising a pair of rotary gears and a shiftable clutch-member adapted for driving engagement with one or the other of the gears for selectively reciprocating the bar or rotating the shaft and their respective carried tools, and means for releasably locking the clutch member in driving engagement with one or the other of said gears, said last-named means comprising a barrel having actuating engagement with the clutch-member, the barrel being provided with spaced peripheral recesses, and a spring-pressed pin disposed in the casing for selective engagement with the barrel at one or the other of its said recesses.

5. A tool of the class described including, in combination, a casing, supports in the casing, a longitudinally and transversely slotted cutting-tool carrying bar having slot and pin connection with the support for lengthwise movement relatively to the casing, and means within the casing comprising a rotary pin having engagement with the bar at its transverse slot for reciprocatorily actuating the same.

6. A tool of the class described including, in combination, a casing, supports in the casing, a longitudinally and transversely slotted cutting-tool carrying bar having slot and pin connection with the supports for lengthwise movement relatively to the casing, and means within the casing for reciprocatorily actuating the bar, said means comprising a rotary disk, and a pin projecting eccentrically from the disk and working in the transverse slot of the bar.

In testimony whereof, I have signed my name to this specification.

THOMAS FULLBRIGHT.